United States Patent [19]

Reynolds et al.

[11] Patent Number: 4,556,422
[45] Date of Patent: * Dec. 3, 1985

[54] PROCESS FOR THE RECOVERY OF LEAD AND SILVER CHLORIDES

[75] Inventors: James E. Reynolds, Golden; Alan R. Williams, Denver, both of Colo.

[73] Assignee: Hazen Research, Inc., Golden, Colo.

[*] Notice: The portion of the term of this patent subsequent to Jun. 30, 1998 has been disclaimed.

[21] Appl. No.: 255,649

[22] Filed: Apr. 20, 1981

Related U.S. Application Data

[63] Continuation-in-part of Ser. No. 80,444, Oct. 1, 1979, Pat. No. 4,276,084.

[51] Int. Cl.$^4$ .................... C22B 13/04; C01G 21/16; C01G 5/02
[52] U.S. Cl. .................... 75/101 R; 75/114; 75/120; 75/118 R; 75/78; 423/27; 423/39; 423/94; 423/98
[58] Field of Search .................. 423/27, 39, 98, 94; 75/118 R, 120, 77, 78, 101 R, 114

[56] References Cited

U.S. PATENT DOCUMENTS

| | | | |
|---|---|---|---|
| 1,396,740 | 11/1921 | Ganelin | 423/98 |
| 1,951,342 | 3/1934 | Bradley | 75/77 |
| 3,172,753 | 3/1965 | Walsh | 75/77 |
| 3,764,490 | 10/1973 | Chambers | 75/101 R |
| 4,082,629 | 4/1978 | Milner | 423/98 |
| 4,135,993 | 1/1979 | Um | 423/98 |
| 4,276,084 | 6/1981 | Reynolds | 423/98 |

OTHER PUBLICATIONS

*International Critical Tables,* vol. 7, (1st ed.), McGraw-Hill, N.Y., 1930, pp. 313-316.

Primary Examiner—John Doll
Assistant Examiner—Robert L. Stoll
Attorney, Agent, or Firm—Sheridan, Ross & McIntosh

[57] ABSTRACT

A process for selectively leaching lead and silver chlorides from a sulfide ore residue in a rapid time which comprises brine leaching the residue under pressure at a temperature above the normal boiling point of the solution, preferably above 100° C.

Modifications are leaching at the agglomeration temperature of sulfur when present in the residue to agglomerate the sulfur for ease of recovery, and flashing from leach temperature to ambient as a lead chloride crystallization recovery step to produce a large crop of lead chloride crystals per pass.

27 Claims, No Drawings

PROCESS FOR THE RECOVERY OF LEAD AND SILVER CHLORIDES

RELATED APPLICATIONS

This application is a continuation-in-part of my U.S. patent application filed Oct. 1, 1979, Ser. No. 080,444, U.S. Pat. No. 4,276,084 entitled "Hydrometallurgical Process to Recover Lead from Lead Concentrates."

TECHNICAL FIELD

The invention lies in the field of recovery of the chlorides of lead and silver by selectively solubilizing the chlorides from other solid materials and the final recovery of the metals from the solubilized chlorides.

BACKGROUND ART

Prior Art Statement

U.S. Pat. No. 4,113,471 discloses a process for brine leaching oxide ores to non-selectively solubilize non-ferrous metal values as chlorides, at elevated temperatures and pressures with the addition of oxygen. Leaching is required for a time of ¼ to 12 hours. There is no selective leaching of lead or silver chlorides from their sulfide ores.

U.S. Pat. Nos. 4,135,993 and 4,173,623 teach brine leaching lead chloride at temperatures of 80°–120° C. to selectively solubilize the lead chloride out of a sulfidic residue containing the sulfides of copper, iron and zinc as well as elemental sulfur. The leaching is not done under pressure. Leach times of ¼ to 2 hours are required in both processes.

International publication No. WO 80/00852, class 22 B 13/00, published under the patent cooperation treaty on May 1, 1980 (01.05.80), discloses the recovery of lead from crystallized lead chloride by reduction with hydrogen or a hydrogen containing compound accompanied by condensing lead chloride volatilized during the reduction process.

DISCLOSURE OF THE INVENTION

Lead and silver chlorides are selectively separated from other solid materials by leaching the materials with a brine leach at elevated temperatures and pressures to selectively solubilize the chlorides, followed by a liquid-solids separation. A starting material on which the process is particularly effective is the sulfidic residue obtained by selectively leaching a sulfidic lead ore with a cupric or a halogenating leach to produce solid lead chloride. Temperatures ranging from the boiling point of the solution to 170° C. are used to selectively solubilize substantially all of the lead and silver chlorides in a rapid time which can be not in excess of about three minutes. If elemental sulfur is present in the starting material, it is agglomerated at elevated temperatures for ease in separation from the solid residue. Lead chloride is crystallized from solution by flashing from the high temperature of the leach to lower temperatures to produce a large crop of lead chloride crystals per pass and elemental lead of high purity recovered from the crystallized lead chloride by hydrogen reduction, or otherwise. Silver chloride is recovered from the mother liquor and processed for recovery of silver.

BEST MODE FOR CARRYING OUT THE INVENTION

Although the process is not limited in its application to any particular starting materials containing lead and silver chlorides, it has been found effective for selectively leaching lead and silver chlorides at a rapid rate from residues obtained by cupric chloride leaching of pyritic or sulfidic lead ores in which lead and silver chlorides are selectively leached at saturation into solid products, all as disclosed in my continuation-in-part application referred to above. Among other materials, these residues contain the sulfides of copper, iron and zinc. The process is equally effective for selectively leaching the residues produced from halogen leach of pyritic ores in the processes of U.S. Pat. Nos. 4,135,993 and 4,173,623. The operation of the invention will be illustrated by its application for the recovery of lead from the residue resulting from the cupric chloride leach of sulfidic ores described in the above-referred-to continuation-in part application.

Pressure Brine Leach

The solids from the cupric chloride leach reaction, comprising lead chloride, silver chloride, elemental sulfur, unreacted metal sulfides of other metals, and gangue, are treated for the selective separation of lead and silver chlorides. The lead and silver chlorides are selectively solubilized from the residue in the illustrative embodiment by leaching with an aqueous brine solution having a sodium chloride concentration of from about 200 gpl to saturation. Suitable substitues for sodium chloride are the other alkali metal chlorides, lithium and potassium chlorides, as well as the alkaline earth metal chlorides, calcium and magnesium chlorides. When other solutes than sodium chloride are used the upper limit of the amount used will change, the the minimum amount of solute preferably being above about 200 gpl. A leach pH of about 0–7 is preferred. Use of too high a pH will precipitate lead compounds. Hydrochloric acid (hydrogen chloride) may also be used as one of the chlorides. The solute must be a chloride which provides maximum chloride ion concentration to the saturation point under the reaction conditions. The solubilization of silver chloride may be enhanced by the use of an oxidant in the leach, such as, sodium chlorate or oxygen.

The brine leach is conducted at a temperature in excess of the solution boiling temperature, which, of course, requires a pressurized system. The temperature is maintained between about 100° C. to about 170° C., the system pressure being selected so as to accommodate the solution temperature while preventing solution boiling. Pressures from about 30 to about 150 psig are suitable to accomplish this purpose. If elmental sulfur is present in the residue the agglomeration temperature of sulfur is used. This is about 130° C. to 140° C. It was found that when the sulfur is agglomerated during the leach and separated from the liquid chlorides in this form with the other solids it can be readily separated from the other solids by physical methods, such as, wet screening.

The brine leach, conducted under the described temperatures and pressures, accomplishes a relatively high solubility of lead and silver chlorides in a relatively short period of time, while leaving the elemental sulfur and unreacted metal sulfides in the residue phase. Retention times of from about 30 seconds to about 5 minutes are generally adequate to dissolve lead chloride to solution concentrations of at least about 130 grams per liter of lead. A preferred leach time is not in excess of about three minutes. Increased lead concentrations as a result of high temperature and pressure brine leach significantly facilitate further separation processing.

The brine leach may be conducted at lower pressures, including atmospheric pressure, and lower temperatures, as in the prior art. However, pressures and temperatures lower than those recited for the preferred range of the brine leach will require more of the brine solution per amount of lead and silver chlorides and a longer retention time in order to solubilize the chlorides.

In a typical application, washed tails or residue as a filter cake from the above-referred-to cupric leach of sulfidic ores was brine leached in an externally heated concentric double pipe pressure leach. Brine containing 280 g/l of NaCl and PbCl$_2$ cake was heated to 135° C. under 50 psig pressure with a one minute retention time to dissolve PbCl$_2$ up to a concentration of 145 g/l Pb. This procedure reduces the size of the crystallizer used in subsequent PbCl$_2$ crystallization and circuit flows to a fraction of that of an ambient pressure system with a corresponding reduction in heating and cooling needs.

To explore the effectiveness of the brine pressure leach at high temperatures in rapidly solubilizing large amounts of lead chloride, the solubility system PbCl$_2$-NaCl-H$_2$O was extended to 144° C. at two brine concentrations of 240 and 320 g/l of NaCl used for leaching a lead sulfide ore residue from a cupric leach, the composition of the residue being typified by the brine leach residues of Examples 1 and 2. The results of the solubility tests reported in Table 1 below show a decided nonlinear increase in the solubility of lead chloride with increase in temperature above the boiling point of the solution, and particularly above 125° C.

TABLE 1

| NaCl g/l | Temperature °C. | Sample Volume ml | Diluted to Volume ml | Diluted Sample Pb g/l | Total Pb in Sample g | Pb Solubility g/l |
|---|---|---|---|---|---|---|
| 240 | 42 | 10.0 | 200 | 0.746 | 0.149 | 14.9 |
|  | 70 | 10.0 | 200 | 1.45 | 0.290 | 29.0 |
|  | 94 | 10.0 | 200 | 2.94 | 0.588 | 58.8 |
|  | 100[1] | 87.5 | 795 | 9.41 | 7.48 | 85.5 |
|  | 124[1] | 76.0 | 1360 | 6.20 | 8.43 | 110.9 |
|  | 144[1] | 79.0 | 1945 | 7.13 | 13.87 | 175.5 |
| 320 | 47.5 | 10.0 | 200 | 0.972 | 0.194 | 19.4 |
|  | 69.0 | 10.0 | 200 | 2.97 | 0.594 | 59.4 |
|  | 96 | 10.0 | 200 | 6.02 | 1.204 | 120.4 |
|  | 100[1] | 8.5 | 1320 | 8.96 | 11.8 | 139.1 |
|  | 124[1] | 8.3 | 2060 | 6.67 | 13.7 | 165.5 |
|  | 135[2] | 9.2 | 1625 | 11.0 | 17.9 | 194.3 |
|  | 143[1] | 8.2 | 2200 | 8.82 | 19.4 | 236.6 |

[1]Sample withdrawn from pressurized autoclave (150 psig N$_2$) using sample bomb.
[2]Repeat run to check data, new solutions.

Since a pipeline brine leach is contemplated in the most feasible commercial application of the process, a minimum leach time is required in the interest of reducing equipment cost and processing time. Rate of brine leaching tests at high temperatures were made on a residue obtained by the above-referred-to cupric leach of a lead sulfide ore. The brine leach contained 250 g/l of NaCl and a pH of about 1.5 was used. The leach temperature was 140° C. The results recorded in Table 2 below indicate that substantially all of the PbCl$_2$ is leached in a time not in excess of about three minutes.

TABLE 2

Rate of Brine Leaching Test
Feed: 50 g cu$^{+2}$ leached residue of a high grade galena containing 58.68 percent Pb and obtained by leaching 200 g of a high grade galena in 1.14 liter of 90 g/l Cu$^{+2}$ and 200 g/l NaCl at pH = 1 (HCl) for one hour at 60° C.
Brine Leach Solution: 1 liter 250 g/l NaCl, pH 1.5.
Procedure: Feed added to solution with continuous stirring. Thief samples removed at designated time and immediately vacuum filtered without rinsing.

| Leach Time (min.) | | Vol. | Wt % Pb | Pb Extraction (%) |
|---|---|---|---|---|
| 1 | PF | 120 ml | 26.1 g/l | 89 |
|  | Residue | 1.9 g | 20.6% |  |
| 3 | PF | 110 ml | 28.6 g/l | 93 |
|  | Residue | 1.3 g | 18.7% |  |
| 10 | PF | 625 ml | 28.5 g/l | 92 |
|  | Residue | 9.1 g | 17.2% |  |

Sulfur Agglomeration

The agglomeration of sulfur is accomplished during leaching by operating the brine leach within the sulfur agglomeration temperature range thereby permitting the sulfur to be readily separated from the remainder of the residue following liquid-solids separation. Agglomeration tests were run on a brine leach residue from cupric leach of lead sulfide ore as referred to above containing elemental sulfur to see if the sulfur could be coalesced to a size large enough for a wet screen separation. The autoclave leach was made at 130° C. The results recorded in Table 3 below shows that the plus 200 mesh fraction contains about 90 percent of the free sulfur with a grade of 82 percent, thus showing that the procedure is feasible for sulfur separation.

TABLE 3

Elemental Sulfur Distribution in ± 200-mesh Size Fractions of S°-Agglomerated Autoclave Leach Residue Feed to Wet Screening 5.0 g, S° - agglomerated product from Test 1151-107-1:
Conditions: Test 1151-99-1 leach residue
130° C.
pH 11.8 with KOH
2 Hours

| Size Fraction | Weight g | S° % | Distribution Weight % | Distribution S° % |
|---|---|---|---|---|
| Plus 200 (beads) | 1.67 | 81.8 | 33.9 | 89.5 |
| Minus 200 (fines) | 3.26 | 4.92 | 66.1 | 10.5 |
| Total/overall | 4.93 | (31.0) | 100.0 | 100.0 |

Liquids-Solids Separation

Following the brine leach, the pregnant lead and silver chloride solution is separated from the remaining residue for subsequent recovery therefrom of lead and silver values. As high temperatures and pressures are utilized during the leach, the liquid-solid separation must be conducted under pressure in order to prevent flash crystallization of the lead chloride from the solution. One suitable technique to accomplish the separation while avoiding flash crystallization is to employ small diameter pressurized liquid cyclones in parallel, the hydroclones operating to permit pressure reduction to atmospheric as the cyclone operation effects a liquid-solids separation. A pressure drop of about 40 psi across the cyclone system occurs. Hydroclone techniques such as those discussed in *The Hydroclone*, D. Bradley, Pergamon Press, Lrd. 1965 may be utilized in this context.

Another solids separation device, such as, an insulated or jacketed pressure leaf filter can be used to accomplish the same objective.

In operation, the pipeline dissolver discharges through a bank of 10 mm alumina cyclones to remove solids at about a 4-5 micron cut point with a let down from a 50 psig pipeline leach to atmospheric, the pressure being utilized to remove the solids. Flocculant may be injected at the cyclone inlet to improve clarity of the cyclone vortex flow. The apex flow, containing unreacted sulfides and agglomerated sulfur, flashes to atmospheric pressure and mixes with concentrate and mother liquor from the subsequent $PbCl_2$ crystallization to quench the hot slurry and solidify beads of agglomerated sulfur. The slurry is gravity-fed to a wet screen or similar separation device to make a separation of agglomerated sulfur beads from other solids, principally, unreacted sulfide tails. The fines are dewatered and finally filtered by conventional filtration. Filtrate is recycled to the leach feed tank and tails cake is discharged to a solids disposal area. Prior to reaching the leaching tank the leach can be purified by a bleed stream in which copper and lead values are recovered by iron cementation and soda ash used at pH 9 to precipitate Fe, Mg, and Zn to permit recycle of barren brine. The residue from sulfur separation is disposed of or further processed for recovery of metal values if warranted.

Lead Chloride Crystallization

Lead chloride is crystallized from the liquid phase resulting from the liquid-solids separation on the brine leach solution for subsequent recovery of elemental lead by hydrogen reduction, or otherwise. Two-stage crystallization may be used with the first-stage at atmospheric pressure and the second stage at about 50 mm Hg absolute to cool the feed to about 40° C. A pregnant brine containing up to 145 g/l Pb flashes typically from 135° C. to ambient temperature in the first stage to produce a large crop of crystals per pass. Surface condensers may be used for the second stage, with contaminated lead chloride condensate being recycled to process. Mother liquor overflow and crystal withdrawal elution leg are specific design requirements to elute minus 5-micron impurities not removed in the cyclones. Alternatively, polish filtration techniques could be used to separate minus 5-micron solids.

Crystallizer under-flow is removed through an elution leg at 40-50 percent solids and advanced to a washing centrifuge. A three percent moisture $PbCl_2$ cake is conveyed to a surge hopper above the $PbCl_2$ reduction furnace.

Lead Recovery from Lead Chloride

The lead chloride is reduced to high purity lead by hydrogen directly without further refining. The remaining solubilized silver chloride is treated for recovery of silver by cementation or other means. Other conventional methods may be used to recover elemental lead from the lead chloride. Hydrogen supplying compounds, such as, methane and propane may be used as a source for hydrogen.

Since the reduction of $PbCl_2$ is endothermic, heat must be supplied to the reaction represented by the formula $PbCl_2 + H_2 Pb + 2$ HCl when an excess of hydrogen over stoichiometric is used. As lead chloride is extremely corrosive, the reactor cannot be made of conventional reactor materials but must be made of material which is substantially impervious to the corrosive action of lead chloride, such as, castable or refractory brick. The materials of which the reactor walls must be made have such a low heat conductivity that it is practically impossible to heat the reactor contents with heat applied to the outside of the walls. Accordingly, it was necessary to devise a practical procedure for internally heating the reactor contents to a temperature up to 900° C. at least. Two alternative procedures were found to be feasible.

In accordance with one procedure a furnace or reactor made of refractory brick was used. Heat for the endothermic reaction occurring in the reaction chamber was supplied by fire tubes submerged in molten lead in contact with lead chloride and the other reactants in the reaction chamber. Means are provided for introducing reactants into the reaction chamber and for continuously or intermittently tapping pure lead from the furnace. Means are also provided for condensing vaporized lead chloride and returning the vaporized lead chloride to the reaction chamber. Lead chloride does not react with molten lead and having a lesser specific gravity floats on top of the molten lead.

The second procedure comprises introducing into the reaction chamber a partially uncombusted gas mixture supplying hydrogen, and completing the combustion with oxygen in an endothermic reaction which supplies heat for the endothermic lead chloride reduction reaction. Heat balance calculations showed that sufficient heat can be brought into the lead chloride reduction reactor to supply the endothermic heat of reaction and other heat requirements, including that caused by heat loss, by using a reducing combustion gas or gas mixture, the term "gas" as used herein and in the claims including both. Any hydrocarbon or mixture of hydrocarbons which supply hydrogen can be used. A mixture produced by a partial combustion of hydrocarbons, such as, methane or propane, provides both the hydrogen and the heat needed for the endothermic reduction of lead chloride. Contrary to what might be expected, introduction into the reaction area of large volumes of water vapor formed in the partial combustion reaction and diluent gases does not adversely affect the reduction reaction. The above described procedure applies also to the recovery of copper from cuprous chloride by reduction of hydrogen.

Illustrative gases and gas mixtures found suitable are $H_2$—CO—$CO_2$, $H_2$—CO—$CO_2$—$H_2O$, and $H_2$—CO—$N_2$. The gases used may or may not be supplemented by hot reducing combustion gas. Oxygen gas or air may be used to supply oxygen.

The $PbCl_2$ cake was metered to a brick-lined $PbCl_2$ reduction furnace as described above operating between 600°-900° C., preferably at about 800° C. A reducing gas feed of 98 percent $H_2$ from an on-site $H_2$ plant was used. An excess of 240 percent of theoretical $H_2$ was fed based on lab tests in batch tube furnace runs. This produces an exit gas consisting of 60 percent HCl and 40 percent $H_2$, by volume. Some volatilized $PbCl_2$ leaves the reactor zone with the off-gas but is refluxed back to the furnace by either a molten lead splash condenser or an air-cooled surface condenser. Any additional heat requirements for the endothermic reduction reaction and to bring reactants up to temperature may be supplied by indirect firing of submerged fire tubes in the molten lead in the reactor as described above. High purity lead is tapped continuously or intermittently from the furnace into a casting machine.

Off-gas is scrubbed in a packed tower or similar scrubbing device using liquor from cupric leach, and a large excess of dilution air to lower $H_2$ content to a safe level and also simultaneously consume scrubbed HCl which may be used to reoxidize the cuprous ion to cupric. A water scrubber may also be used to recover the HCl. Exit gas, free of HCl and particulate matter, is exhausted to atmosphere.

Up to over 99 percent of lead was obtained from the starting material. Lead having a purity of +99.9 percent was consistently obtained by the process. The recoveries of lead and silver shown in Tables 4 and 5, as produced by Examples 1 and 2, are representative of recoveries obtained by the process. The lead purity obtained in Example 2 is also typical.

EXAMPLE 1

Two different 100 gram samples of a lead concentrate having a composition of 18 percent lead, 26.2 percent zinc, 0.54 percent copper, 5.1 troy ounces of silver ore ton of concentrate, 0.029 percent antimony and 14.4 percent iron were treated with 250 milliliters of a cupric chloride leach solution comprising about 50 grams of copper per liter as cupric chloride and 200 grams of sodium chloride per liter. The pH of the leach solution was maintained at about 1 through the addition of hydrochloric acid. After 3 hours, a total of 4.08 and 4.80 grams of hydrochloric acid were added to Sample 1 and Sample 2, respectively. The cupric chloride leach of Sample 1 was conducted at a temperature of 60° C. and the cupric chloride leach of Sample 2 was conducted at a temperature of 80° C. The residue of the cupric chloride leach of each of the samples was separately brine leached in a brine solution containing about 250 grams of sodium chloride per liter at a temperature of 80°–85° C. and about one atmosphere for one-half hour. Each brine leach slurry was filtered while hot and the residue was washed first with hot brine solution and then with water. The analyses of the brine leach residue and the results of this extraction are set forth in Table 4. The negative extracted copper percentages are due to a portion of the cupric chloride of the leach solution being precipitated to copper sulfide.

sufficient hydrochloric acid to maintain a pH of about 1. The cupric chloride leach was conducted at a temperature of 60° C. for two hours. The residue of the cupric chloride leach was subjected to a 900 milliliter brine leach at a temperature of 80°–90° C. and about atmospheric pressure of one-half hour. The brine solution contained about 250 grams of sodium chloride per liter. The analysis of the brine leach residue, which weighed 83 grams, and the results of the extraction are set forth in Table 5.

The extraction resulted in 19.0 grams of lead chloride being produced. This lead chloride was reduced to lead in an atmosphere of 175 cubic centimeters per minute of hydrogen, 75 cubic centimeters per minute of carbon monoxide, 75 cubic centimeters per minute of carbon dioxide at a temperature of 800° C. for 35 minutes. The lead metal was assayed by emission spectroscopy. The lead metal was 99.98 percent pure. It contained impurities of 0.01 percent silicon, 0.005 percent iron, 0.001 percent copper and 0.001 percent bismuth with no other elements being detected.

TABLE 5

| Brine Leach Residue Assay, % | | | | | |
|---|---|---|---|---|---|
| Pb | Cu | Zn | Fe | Ag (oz/ton) | Sb |
| 0.21 | 0.805 | 13.9 | 22.8 | 2.0 | 0.33 |
| Extraction, % | | | | | |
| Pb | Cu | Zn | Fe | Ag | Sb |
| 99.4 | −48.5 | 3.6 | 7.1 | 81.6 | 32 |

We claim:

1. A process for solubilizing a chloride selected from the group consisting of lead chloride and a combination of silver and lead chlorides which comprises subjecting the chloride to a brine leach at a temperature above the normal boiling point under a pressure above atmospheric sufficient to prevent boiling for a sufficient time to solubilize substantially all of the chloride.

2. The process of claim 1 in which the temperature is maintained above the normal boiling point to about 170° C.

3. The process of claim 1 in which the time of leach

TABLE 4

| Cupric Leach Time (Hours) | Product | Weight (gm) | Brine Leach Residue Assay, % | | | | | | Extraction, % | | | | | |
|---|---|---|---|---|---|---|---|---|---|---|---|---|---|---|
| | | | Pb | ZN | Cu | FE | Ag (oz/ton) | Sb | Pb | Zn | Cu | Fe | Ag | Sb |
| Sample 1: | | | | | | | | | | | | | | |
| 1.0 | 1 hr. residue | 4.32 | 0.49 | 36.1 | 0.78 | 20.3 | 1.4 | 0.013 | 98.3 | 11.8 | 7.9 | 7.6 | 82.4 | 71 |
| 3.0 | Final residue | 50.7 | 0.11 | 36.1 | 0.96 | 20.0 | 1.8 | 0.014 | 99.6 | 18.7 | −4.5 | 18.1 | 79.2 | 72 |
| Sample 2: | | | | | | | | | | | | | | |
| 1.0 | 1 hr. residue | 4.43 | 0.10 | 37.4 | 0.98 | 19.8 | 1.2 | 0.018 | 99.6 | 7.2 | −17.5 | 10.6 | 84.7 | 60 |
| 2.0 | 2 hr. residue | 4.52 | 0.08 | 36.7 | 1.00 | 19.2 | 1.1 | 0.011 | 99.7 | 17.4 | −8.9 | 21.3 | 87.3 | 78 |
| 3.0 | Final residue | 48.3 | 0.06 | 36.2 | 1.44 | 19.8 | 1.2 | 0.015 | 99.8 | 22.6 | −49 | 23.0 | 86.8 | 71 |

EXAMPLE 2

A 125 gram sample of a lead concentrate having a composition of 25.1 percent lead, 9.57 percent zinc, 0.36 percent copper and 16.3 percent iron was treated with 500 milliliters of a cupric chloride leach solution comprising about 50 grams of copper per liter as cupric chloride, 200 grams of sodium chloride per liter and is not in excess of about three minutes and a concentration of at least about 130 gpl of lead chloride is obtained.

4. The process of claim 1 in which the brine leach comprises an aqueous solution containing about 200–300 gpl to saturation of a soluble chloride which provides a maximum concentration of chloride ion below saturation.

5. The process of claim 4 in which the chloride is a member selected from the group consisting of chlorides of alkali and alkaline earth metals and hydrogen chloride.

6. The process of claim 1 in which the chloride solubilized is lead chloride.

7. A process for selectively solubilizing a chloride selected from the group consisting of lead chloride and a combination of lead and silver chlorides contained in a mixture of other solids including metal sulfides which comprises subjecting the mixture to a brine leach under a normal boiling point.

8. The process of claim 7 in which the temperature is in excess of about 100° C.

9. The process of claim 8 in which the leaching is performed in a time not in excess of about three minutes and a concentration of at least about 130 gpl of lead chloride is obtained.

10. The process of claim 8 in which said metal sulfides include the sulfides of copper, iron and zinc.

11. The process of claim 10 in which the time of leach is less than about three minutes and a concentration tration of at least about 130 gpl of lead chloride is obtained.

12. The process of claim 10 in which the brine leach comprises an aqueous solution containing at least about 200 gpl of soluble chloride which provides a maximum concentration of chloride ion below saturation.

13. The process of claim 12 in which said chloride is a member selected from the group consisting of chlorides of alkali and alkaline earth metal chlorides and hydrogen chloride.

14. The process of claim 8 in which the chloride solubilized is lead chloride.

15. The process of claim 13 in which said chloride is sodium chloride.

16. The process of claim 8 in which the solubilized silver and lead chlorides are separated from solids.

17. The process of claim 16 in which said separation is accomplished by liquid cyclone separation.

18. The process of claim 16 in which lead chloride is crystallized from the solution and silver chloride is recovered from the mother liquor.

19. The process of claim 16 in which lead chloride is recovered from the brine solution by crystallization.

20. The process of claim 19 in which said crystallization includes flashing from the brine leach temperature to a lower temperature.

21. The process of claim 8 in which said mixture includes elemental sulfur and the temperature of said brine leach is at the agglomeration temperature of sulfur.

22. The process of claim 19 in which lead is recovered from the crystallized lead chloride.

23. The process of claim 22 in which the lead is recovered by hydrogen reduction of the crystallized lead chloride.

24. The process of claim 23 in which the hydrogen and the heat requirement for the endothermic reduction of lead chloride are supplied by a partially combusted hydrocarbon gas.

25. The process of claim 23 including supplying the heat required for the endothermic reduction by heating molten lead introduced into the reaction area.

26. A process for solubilizing a chloride selected from the group consisting of lead chloride and a combination of silver and lead chlorides which comprises subjecting the chloride to a brine leach at a temperature above the normal boiling point under a pressure above atmospheric sufficient to prevent boiling for a time not in excess of 3 minutes sufficient to solubilize substantially all of the chloride.

27. A process for solubilizing a chloride selected from the group consisting of lead chloride and a combination of silver and lead chlorides which comprise subjecting the chloride to a brine leach at a temperature above the normal boiling point under a pressure above atmospheric sufficient to prevent boiling for a sufficient time to obtain a concentration of at least about 130 gpl of solubilized lead chloride.

* * * * *